United States Patent Office 3,592,682
Patented July 13, 1971

3,592,682
WATER ACTIVATED ADHESIVE RIBBON
Sol S. Weiner, Evanston, Burton A. Gale, Skokie, and Heinz A. Diedler, Chicago, Ill., assignors to CPS Industries, Chicago, Ill.
No Drawing. Filed Oct. 27, 1966, Ser. No. 589,849
Int. Cl. C09j 7/04
U.S. Cl. 117—76A
3 Claims

ABSTRACT OF THE DISCLOSURE

A unitary composite remoistenable flexible tape structure which is fabricated from an olefin polymer, such as polypropylene which is generally of an extruded form, an intermediate adhesive bonding layer or tie coating of an organic chemical composition, such as a methylated paraffinic chain hydrocarbon resin of petroleum origin or a polyterpene resin ester or an ethylene/vinyl acetate copolymer, and a remoistenable organic adhesive layer. The bonding layer performs an intermediate adhesive bonding function between the remoistenable adhesive layer, such as a polyvinyl alcohol resinous coating, and the other surface of the tape thereby forming a unitary composite structure.

---

This invention relates to the art of tapes or decorative ribbons and means for making the same and more specifically to thermoplastic tapes or ribbons having coatings of adhesives activated by water for forming bows, bands and other structures in which portions of the ribbon or tape surfaces are secured to other portions of the ribbon or tape surfaces at points where the adhesive is wetted.

With the older types of weftless decorative ribbons or tapes made of materials such as cotton or rayon threads bonded together with adhesives such as gelatins or polyvinyl alcohol, it was easy to secure a portion of the surface of the ribbon to another portion of the surface of the ribbon by merely licking or wetting one of the portions and sticking it to the other portion. This lick-and-stick feature was generally obtainable in the prior art ribbons because of the judicious use of adhesives used to bond the threads together.

Recent advances in technology have made thermoplastic ribbons, such as those made of polypropylene, economically competitive with the older weftless ribbons made of rayon or cotton. The thermoplastic ribbons, however, do not have the lick-and-stick property of the older ribbons because no adhesive is used in their fabrication. Users of thermoplastic ribbons and tapes have found this deficiency to be a great inconvenience because they have to use other external means for securing the ribbon or the tape.

Accordingly, it is a principal object of this invention to provide a thermoplastic ribbon or tape having lick-and-stick characteristics.

Several attempts have been made to secure adhesives which are water activated, described herein as water-activated adhesive layers, to polypropylene tapes or ribbons; however, these met with little success because the polypropylene molecule has no groups to which water-activated adhesives can be attached.

Further, a number of attempts have been made to provide the lick-and-stick quality with a number of materials which would adhere to polypropylene. These attempts also met with little success.

In the ribbons and tapes of this invention, the lick-and-stick quality found in the prior art weftless tapes has been attained with thermoplastic tapes by means of a two layer coating which adheres to the thermoplastic tape surface and which provides the lick-and-stick feature.

In this invention, the ribbon is fabricated by coating both surfaces of a thermoplastic tape, which may have a decorative design, a distinctive color, or other visual characteristics, first with a tie coat, which may be a pressure sensitive material or a material having hydrophobic and hydrophilic functional groups, which adheres to the ribbon and later with a layer of adhesive which is activated in the presence of water.

Where the tape is fabricated from polyolefin, polypropylene, polyvinyl acetate, cellulose acetate, acrylic, polyvinyl alcohol or polyethylene, suitable tie coats are formed by applying Hercoprime (a trademark of Hercules Powder Co. for a synthetic polymer primer), Hercoprime 15X (a trademark of Hercules Powder Co. for a synthetic polymer primer in an aromatic solvent wherein the preferred composition is a solution of about 5% of the aforementioned hydrogenated resin ester in xylene), Reslac SD–5175 (a trademark of Borden Chemical Co. for an ethylene-vinyl acetate copolymer), Elvax (a trademark of E. I. du Pont de Nemours & Co., for a resinous bonding agent) consisting essentially of a composition of high molecular weight ethylene-vinyl acetate copolymers.

The tie-coats are applied directly to the tape without prior surface preparation and are dried at a temperature below that which will soften the tape.

After the tie coat has dried, a layer of an adhesive which is activated in the presence of water is applied over each of the exposed surfaces of the tie coat. Adhesives which are best suited for this application are polyvinyl alcohol, polyvinyl acetate, dextrin, starch, casein, natural gum, synthetic gum, protein and animal glue.

The adhesive layer is also dried at a temperature below that which will cause the tape to soften.

In a preferred embodiment of this invention, the tape is fabricated from foamed and substantially unidirectionally oriented polypropylene. The tie coat is formed by applying a coating of Hercoprime 15X to the tape.

Reslac SD–5175 can be substituted for Hercoprime 15X; however, it does not provide as good adhesion as can be obtained with the use of Hercoprime 15X.

After the tie coat has dried, a layer of partially hydrolized polyvinyl alcohol having a residual polyvinyl acetate content of less than 5% by weight is added as the water activated adhesive layer over the tie coat. One such polyvinyl alcohol is Gelvatol 3–60 (a trademark of Monsanto Chemical Co. for polyvinyl alcohol of the type described).

It will be obvious to those skilled in the art that many modifications differing from the illustrated embodiment are possible which do not deviate from the spirit of the invention, the scope of which is defined by the following claims.

What is claimed is:
1. A water remoistenable adhesive flexible tape comprising a flexible plastic ribbon having surfaces which are normally hydrophobic and repel water remoistenable adhesive compositions, an intermediate adhesive bonding layer capable of being bonded on at least one surface of said plastic ribbon surfaces, and a water remoistenable adhesive layer deposited subsequently on the unbonded other surface of said bonding layer thereby forming a unitary flexible tape structure.
2. A water remoistenable adhesive flexible tape according to claim 1 wherein the plastic ribbon is of an olefin polymer composition and the water remoistenable adhesive layer is of a polyvinyl alcohol composition.

3. A water remoistenable adhesive flexible tape according to claim 1 wherein the plastic ribbon is of a polypropylene composition.

References Cited

UNITED STATES PATENTS

| 2,348,220 | 5/1944 | Kline | 117—122 |
|---|---|---|---|
| 2,647,843 | 8/1953 | Bemmels | 117—122X |
| 2,746,881 | 5/1956 | Wegener | 117—122X |
| 2,850,468 | 9/1958 | Giggey | 260—17.4 |
| 2,953,475 | 9/1960 | Bergsted et al. | 117—122X |
| 3,091,553 | 5/1963 | Matsumoto et al. | 117—138.8 |

WILLIAM D. MARTIN, Primary Examiner

T. G. DAVIS, Assistant Examiner

U.S. Cl. X.R.

117—122S, 138.8E